United States Patent
Gloger et al.

(10) Patent No.: US 10,208,182 B2
(45) Date of Patent: Feb. 19, 2019

(54) POLYPROPYLENE COMPOSITION SUITABLE FOR PRIMERLESS PAINTING

(71) Applicant: Borealis AG, Vienna (AT)

(72) Inventors: Dietrich Gloger, Linz (AT); Claudia Kniesel, Linz (AT); Georg Grestenberger, St. Peter in der Au (AT); Daniela Mileva, Linz (AT)

(73) Assignee: BOREALIS AG (AT)

( * ) Notice: Subject to any disclaimer, the term of this patent is extended or adjusted under 35 U.S.C. 154(b) by 0 days.

(21) Appl. No.: 15/100,176

(22) PCT Filed: Dec. 1, 2014

(86) PCT No.: PCT/EP2014/076111
§ 371 (c)(1),
(2) Date: May 27, 2016

(87) PCT Pub. No.: WO2015/082402
PCT Pub. Date: Jun. 11, 2015

(65) Prior Publication Data
US 2017/0051125 A1 Feb. 23, 2017

(30) Foreign Application Priority Data
Dec. 4, 2013 (EP) .................... 13195767

(51) Int. Cl.
*C08K 3/34* (2006.01)
*C08L 23/14* (2006.01)

(52) U.S. Cl.
CPC ............... *C08K 3/34* (2013.01); *C08L 23/14* (2013.01); *C08L 2205/02* (2013.01); *C08L 2205/025* (2013.01)

(58) Field of Classification Search
CPC ....... C08K 3/34; C08L 23/14; C08L 2205/02; C08L 2205/025
USPC ....................................................... 524/451
See application file for complete search history.

(56) References Cited

U.S. PATENT DOCUMENTS 8,143,353 B2    3/2012   Canich et al.

FOREIGN PATENT DOCUMENTS

| CN | 88101754 A | 12/1998 |
|----|---|---|
| CN | 102421844 A | 4/2012 |
| CN | 102639309 A | 8/2012 |
| EP | 0586390 B1 | 5/1997 |
| EP | 0591224 B1 | 2/1998 |
| EP | 0846696 A1 | 6/1998 |
| EP | 0887379 A1 | 12/1998 |
| EP | 0887380 A1 | 12/1998 |
| EP | 0887381 A1 | 12/1998 |
| EP | 0491566 B2 | 3/2005 |
| EP | 0991684 B1 | 1/2006 |
| EP | 2251375 A1 | 11/2010 |
| JP | H08-188684 A | 7/1996 |
| JP | H09-208881 A | 8/1997 |
| JP | 2004-530781 A | 10/2004 |
| JP | 2009-504882 A | 2/2009 |
| JP | 2010-111784 A | 5/2010 |
| WO | 8707620 A1 | 12/1987 |
| WO | 8807564 A1 | 10/1988 |
| WO | 9219653 A1 | 11/1992 |
| WO | 9219658 A1 | 11/1992 |
| WO | 2010/128065 A1 | 11/2010 |
| WO | WO 2010128065 A1 * | 11/2010 .............. C08L 23/00 |

OTHER PUBLICATIONS

Singh, Gurmeet, et al., "Triad Sequence Determination of Ethylene-Propylene Copolymers—Application of Quantitative 13C NMR", Polymer Testing 28 (2009) 475-479.
Resconi, et al., Chemical Reviews, 2000, vol. 100, No. 4, pp. 1316-1327.
Busico, Vincenzo, et al., "Alk-1-ene Polymerization in the Presence of a Monocyclopentadienyl Zirconium(IV) Acetamidinate Catalyst: Microstructural and Mechanistic Insights", Macromol. Rapid Commun. 2007, 28, 1128-1134.
Cheng, H.N., "13C NMR Analysis of Ethylene-Propylene Rubbers", Macromolecules 1984, 17, 1950-1955.
Resconi, Luigi, et al., "Selectivity in Propene Polymerization With Metallocene Catalysts", Chem. Rev. 2000, 100, 1253-1345.
Wang, Wen-Jun, et al., "Structural Analysis of Ethylene/Propylene Copolymers Synthesized With a Constrained Geometry Catalyst", Macromolecules 2000, 33, 1157-1162.
Zhou, Zhe, et al., "A New Decoupling Method for Accurate Quantification of Polyethylene Copolymer Composition and Triad Sequence Distribution With 13C NMR", Journal of Magnetic Resonance 187 (2007) 225-233.
Zweifel, Plastic Additive Handbook, 2001, pp. 956-965.
Office action for Chinese Application No. 201480064492.9, dated Mar. 3, 2017.

(Continued)

*Primary Examiner* — Ling Siu Choi
*Assistant Examiner* — Ronald Grinsted
(74) *Attorney, Agent, or Firm* — Tarolli, Sundheim, Covell & Tummino LLP

(57) ABSTRACT

The present invention is directed to a polypropylene composition (C), an article comprising the polypropylene composition (C) and the use of the polypropylene composition (C) to reduce paintability failure of a molded article. The polypropylene composition (C) comprises (a) 40.0 to 80.0 wt. %, based on the total weight of the composition, of a propylene copolymer (R-PP) having: (a1) a comonomer content in the range of 1.5 to 8.0 wt. %, and (a2) a melt flow rate $MFR_2$ (230° C.) measured according to ISO 1133 in the range of 5.0 to 100.0 g/10 min, and (b) 20.0 to 40.0 wt. %, based on the total weight of the composition, of a mineral filler (F) being selected from the group consisting of talcum, wollastonite, kaolin, and mica, wherein the polypropylene composition (C) has a melt flow rate $MFR_2$ (230° C.) measured according to ISO 1133 in the range of 5.0 to 45.0 g/10 min.

12 Claims, 1 Drawing Sheet

(56) References Cited

OTHER PUBLICATIONS

Office Action for Chinese Patent Application No. 201480064492.9, dated Apr. 27, 2018.
Weixing Tu, "Practical Technical Manual of Automobile maintenance for metaler", Jiangsu Science and Technology Press, 1st edition, p. 443, Pub. Jan. 31, 2007.
Japanese Office action for Patent Application No. JP 2016-534641.
"A collection of methodical recommendations on issues of invention examination", VNIIPI Moscow, 1983 pp. 42-45.
Office action for Eurasian Patent Application No. 201691030, dated Oct. 15, 2018.

\* cited by examiner

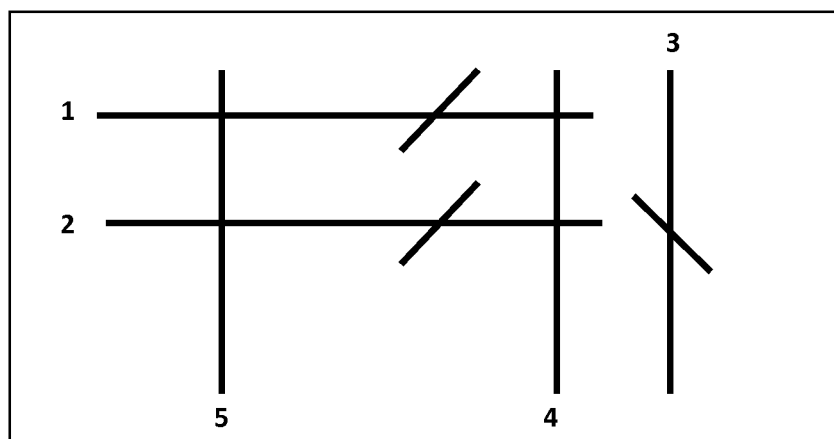
Test lines used for evaluation of the failed painted areas

POLYPROPYLENE COMPOSITION SUITABLE FOR PRIMERLESS PAINTING

The present invention is directed to a polypropylene composition (C), an article comprising the polypropylene composition (C) as well as the use of the polypropylene composition (C) to reduce paintability failure of a molded article.

In the field of automotive applications, polyolefins such as polypropylenes are the material of choice as they can be tailored to specific purposes needed. For instance, heterophasic polypropylenes are widely used in the automobile industry (for instance in bumper applications) as they combine good stiffness with reasonable impact strength behavior. Heterophasic polypropylenes contain a polypropylene matrix in which an amorphous phase is dispersed. The amorphous phase contains a plastomer; like a linear low density polyethylene (LLDPE), or a propylene copolymer rubber, like an ethylene propylene rubber (EPR) or an ethylene propylene diene monomer polymer (EPDM). In the case of propylene copolymer rubber the heterophasic polypropylene may contain additionally a crystalline polyethylene to some extent.

However, the surface of polyolefins is rather smooth and the polarity rather low resulting in unfavorable prerequisites for interactions with a coating material. Thus, for demanding applications like automotive parts a pretreatement as well as the application of an adhesion promoting layer (a so called primer) is typically used to ensure proper paint adhesion. However, due to environmental reasons it is desired to reduce the use of primers to a minimum or to avoid the use of primers at all.

Thus, the object of the present invention is to provide a material which enables a skilled person to produce molded articles having a good stiffness/impact balance and high paint adhesion even without the use of primers.

The finding of the present invention is to provide a polypropylene composition (C) having a defined combination of a propylene copolymer (R-PP) and a mineral filler (F).

Accordingly the present invention is directed to a polypropylene composition (C), the polypropylene composition (C) comprising
(a) 40.0 to 80.0 wt.-%, based on the total weight of the composition, of a propylene copolymer (R-PP) having
  (a1) a comonomer content in the range of 1.5 to 8.0 wt.-%, and
  (a2) a melt flow rate $MFR_2$ (230° C.) measured according to ISO 1133 in the range of 5.0 to 100.0 g/10 min, and
(b) 20.0 to 40.0 wt.-%, based on the total weight of the composition, of a mineral filler (F) being selected from the group consisting of talcum, wollastonite, caolin and mica, wherein the polypropylene composition (C) has a melt flow rate $MFR_2$ (230° C.) measured according to ISO 1133 in the range of 5.0 to 45.0 g/10 min According to one embodiment of the present invention, the propylene copolymer (R-PP) has
(a) a glass transition temperature in the range of −12 to +2° C.;
and/or
(b) no glass transition temperature below −20° C.

According to another embodiment of the present invention, the propylene copolymer (R-PP) has
(a) a melting temperature in the range of 135 to 165° C., and/or
(b) a tensile modulus of at least 800 MPa, and/or
(c) a Charpy notched impact strength at +23° C. of ≥4 $kJ/m^2$.

According to yet another embodiment of the present invention, the propylene copolymer (R-PP)
(a) has 2,1 regio-defects of at most 0.4% determined by $^{13}C$-NMR spectroscopy; and/or
(b) is monophasic.

According to one embodiment of the present invention, the propylene copolymer (R-PP) comprises a comonomer selected from ethylene, $C_4$ to $C_{12}$ α-olefin and mixtures thereof, preferably the comonomer is ethylene.

According to another embodiment of the present invention, the propylene copolymer (R-PP) comprises two fractions, a first propylene copolymer fraction (R-PP1) and a second propylene copolymer fraction (R-PP2), said first propylene copolymer fraction (R-PP1) differs from said second propylene copolymer fraction (R-PP2) in the comonomer content.

According to yet another embodiment of the present invention,
(a) the weight ratio between the first propylene copolymer fraction (R-PP1) and the second propylene copolymer fraction (R-PP2) of the propylene copolymer (R-PP) [(R-PP1):(R-PP2)] is 70:30 to 30:70;
and/or
(b) the comonomers for the first propylene copolymer fraction (R-PP1) and the second propylene copolymer fraction (R-PP2) of the propylene copolymer (R-PP) are selected from ethylene, $C_4$ to $C_{12}$ α-olefin, and mixtures thereof, preferably the comonomers for the first propylene copolymer fraction (R-PP1) and the second propylene copolymer fraction (R-PP2) are the same and are selected from ethylene, $C_4$ to $C_{12}$ α-olefin, and mixtures thereof According to one embodiment of the present invention,
(a) the first propylene copolymer fraction (R-PP1) of the propylene copolymer (R-PP) is the comonomer lean fraction and the second propylene copolymer fraction (R-PP2) of the propylene copolymer (R-PP) is the comonomer rich fraction
and/or
(b) the first propylene copolymer fraction (R-PP1) of the propylene copolymer (R-PP) has a lower comonomer content than the propylene copolymer (R-PP).

According to another embodiment of the present invention, wherein
(a) the first propylene copolymer fraction (R-PP1) and the second propylene copolymer fraction (R-PP2) of the propylene copolymer (R-PP) fulfill together the in-equation (I)

$$\frac{Co(R-PP2)}{Co(R-PP1)} \geq 1.0; \qquad (I)$$

wherein
Co (R-PP1) is the comonomer content [wt.-%] of the first propylene copolymer fraction (R-PP1),
Co (R-PP2) is the comonomer content [wt.-%] of the second propylene copolymer fraction (R-PP2).
and/or,
(b) the first propylene copolymer fraction (R-PP1) and the propylene copolymer (R-PP) fulfill together the in-equation (II)

$$\frac{Co(R-PP)}{Co(R-PP1)} \geq 1.0 \qquad (II)$$

wherein

Co (R-PP1) is the comonomer content [wt.-%] of the first propylene copolymer fraction (R-PP1), Co (R-PP) is the comonomer content [wt.-%] of the propylene copolymer (R-PP).

According to yet another embodiment of the present invention, the mineral filler (F) is talc, preferably the talc has an average particle size d50 in the range of 0.5 to 20.0 μm.

According to one embodiment of the present invention, the polypropylene composition (C) comprises 2.0 to 15.0 wt.-%, based on the total weight of the composition, of an elastomeric copolymer (E) comprising units derived from ethylene and $C_4$ to $C_8$ α-olefins According to another embodiment of the present invention, the elastomeric copolymer (E) has (a) a density of equal or less than 935 kg/m$^3$, and/or (b) a melt flow rate $MFR_2$ (190° C.) measured according to ISO 1133 in the range of 0.25 to 30.0 g/10 min.

The present invention also relates to an article comprising the polypropylene composition (C).

It is preferred that the article is an automotive article, preferably an exterior or interior automotive article selected from bumpers, body panels, rocker panels, side trims, step assists, spoilers and dash boards.

A further aspect of the present invention is the use of the above polypropylene composition (C) to reduce paintability failure, i.e. to enhance paint adesion, of a molded article, preferably to reduce paintability failure, i.e. to enhance paint adhesion, of an injection molded article, such as automotive articles.

In the following the invention will be described in more detail.

Polypropylene Composition (C)

It is one requirement of the present invention that the polypropylene composition (C) comprises (a) 40.0 to 80.0 wt.-%, based on the total weight of the composition, of a propylene copolymer (R-PP) having (a1) a comonomer content in the range of 1.5 to 8.0 wt.-%, and (a2) a melt flow rate $MFR_2$ (230° C.) measured according to ISO 1133 in the range of 5.0 to 100.0 g/10 min, and (b) 20.0 to 40.0 wt.-%, based on the total weight of the composition, of a mineral filler (F) being selected from the group consisting of talcum, wollastonite, caolin and mica, wherein the polypropylene composition (C) has a melt flow rate $MFR_2$ (230° C.) measured according to ISO 1133 in the range of 5.0 to 45.0 g/10 min In a preferred embodiment of the present invention, the polypropylene composition (C) comprises (a) 40.0 to 75.0 wt.-%, based on the total weight of the composition, of the propylene copolymer (R-PP), and (b) 25.0 to 35.0 wt.-%, based on the total weight of the composition, of the mineral filler (F).

For example, the polypropylene composition (C) comprises (a) 50.0 to 70.0 wt.-%, based on the total weight of the composition, of the propylene copolymer (R-PP), and (b) 25.0 to 35.0 wt.-%, based on the total weight of the composition, of the mineral filler (F).

Typically the polypropylene composition (C) has a rather low melt flow rate. It is thus desired that the polypropylene composition (C) has a melt flow rate $MFR_2$ (230° C.) measured according to ISO 1133 in the range of 5.0 to 45.0 g/10 min. More specifically, the polypropylene composition (C) has a melt flow rate $MFR_2$ (230° C.) measured according to ISO 1133 in the range of 5.0 to 35.0 g/10 min. For example, the polypropylene composition (C) has a melt flow rate $MFR_2$ (230° C.) measured according to ISO 1133 in the range of 10.0 to 25.0 g/10 min, like in the range of 10.0 to 20.0 g/10 min.

It is further preferred that the polypropylene composition (C) has a good stiffness/impact balance. It is thus preferred that the polypropylene composition (C) shows good impact behavior. Accordingly it is appreciated that the polypropylene composition (C) has Charpy notched impact strength at +23° C. of at least 1 kJ/m$^2$, more preferably in the range of 1 to 70 kJ/m$^2$, still more preferably in the range of 1 to 50 kJ/m$^2$ and most preferably in the range of 1 to 20 kJ/m$^2$.

Additionally or alternatively, the tensile modulus of the polypropylene composition (C) should be rather high. It is preferred that the flexural modulus of the polypropylene composition (C) is in the range from 2800 to 4500 MPa, more preferably in the range of 3000 to 4250 MPa, even more preferably of 3000 to 4000 MPa, still more preferably in the range of 3000 to 3800 MPa.

The polypropylene composition (C) of the instant invention may contain up to 5.0 wt.-% additives excluding the mineral filler as define in detail below (F), like additional polymers and antioxidants, as well as slip agents and antiblocking agents. Preferably, the total content of additives in the polypropylene composition (C) is below 5.0 wt.-%, like below 4.0 wt.-%, based on the total weight of the polypropylene composition (C).

One additional polymer which may be present in such low amounts is a polypropylene different to the propylene copolymer (R-PP), like a homopolymer (PP-H), which is used an additive carrier. For example, the polypropylene composition (C) comprises the polypropylene homopolymer (PP-H) in an amount from 0.5 to 4.0 wt.-%, preferably in an amount from 1.0 to 3.0 wt.-%, and most preferably in an amount from 1.2 to 2.0 wt.-%, based on the total weight of the composition.

The expression polypropylene homopolymer (PP-H) used in the instant invention relates to a polypropylene that consists substantially, i.e. of more than 99.5 wt.-%, still more preferably of at least 99.7 wt.-%, like of at least 99.8 wt.-%, of propylene units. In a preferred embodiment, only propylene units in the polypropylene homopolymer (PP-H) are detectable.

In the following the individual components of the polypropylene composition (C) are described in more detail.

Propylene Copolymer (R-PP)

It is one requirements of the present invention that the polypropylene composition (C) comprises the propylene copolymer (R-PP) in an amount from 40.0 to 80.0 wt.-%, based on the total weight of the composition.

In one embodiment of the present invention, the polypropylene composition (C) comprises the propylene copolymer (R-PP) in an amount from 40.0 to 75.0 wt.-%, based on the total weight of the composition. For example, the polypropylene composition (C) comprises the propylene copolymer (R-PP) in an amount from 50.0 to 70.0 wt.-%, based on the total weight of the composition.

For example, the polypropylene composition (C) comprises the propylene copolymer (R-PP) in an amount from 40.0 to 65.0 wt.-%, preferably from 45.0 to 64.0 wt.-%, based on the total weight of the composition. In one embodiment, the polypropylene composition (C) comprises the propylene copolymer (R-PP) in an amount from 50.0 to 62.0 wt.-%, based on the total weight of the composition.

Alternatively, the polypropylene composition (C) comprises the propylene copolymer (R-PP) in an amount from 65.0 to 75.0 wt.-%, more preferably from 65.0 to 70.0 wt.-%, based on the total weight of the composition. The foregoing is preferably applicable in case the polypropylene composition (C) is free of an elastomeric copolymer (E).

It is preferred that the propylene copolymer (R-PP) before being mixed with the other components mentioned herein comprises as polymer components only the propylene copolymer (R-PP). In other words the propylene copolymer (R-PP) may contain further additives but no other polymer in an amount exceeding 5.0 wt.-%, more preferably exceeding 2.5 wt.-%, based on the total weight of the propylene copolymer (R-PP), more preferably based on the polymers present in the propylene copolymer (R-PP).

It is appreciated that the propylene copolymer (R-PP) according to this invention before being mixed with the other components mentioned herein is preferably monophasic. Accordingly, it is preferred that the propylene copolymer (R-PP) before being mixed with the other components mentioned herein does not contain elastomeric (co)polymers forming inclusions as a second phase for improving mechanical properties. A polymer containing elastomeric (co)polymers as insertions of a second phase would by contrast be called heterophasic and is preferably not part of the present invention. The presence of second phases or the so called inclusions are for instance visible by high resolution microscopy, like electron microscopy or atomic force microscopy, or by dynamic mechanical thermal analysis (DMTA). Specifically in DMTA the presence of a multiphase structure can be identified by the presence of at least two distinct glass transition temperatures.

Accordingly it is preferred that the propylene copolymer (R-PP) according to this invention has no glass transition temperature below −20° C., preferably below −25° C., more preferably below −30° C.

On the other hand, in one preferred embodiment the propylene copolymer (R-PP) according to this invention has a glass transition temperature in the range of −12 to +2° C., more preferably in the range of −10 to +2° C.

The propylene copolymer (R-PP) according to this invention has a melt flow rate $MFR_2$ (230° C.) measured according to ISO 1133 in the range of 5.0 to 100.0 g/10 min, more preferably in the range of 5.0 to 80.0 g/10 min, still more preferably in the range of 5.0 to 60.0 g/10 min The propylene copolymer (R-PP) comprises apart from propylene also comonomers. Preferably the propylene copolymer (R-PP) comprises apart from propylene a comonomer selected from ethylene, $C_4$ to $C_{12}$ α-olefin and mixtures thereof. Accordingly, the term "propylene copolymer" according to this invention is preferably understood as a polypropylene comprising, preferably consisting of, units derivable from (a) propylene
and
(b) ethylene and/or $C_4$ to $C_{12}$ α-olefins.

Thus, the propylene copolymer (R-PP) according to this invention preferably comprises monomers copolymerizable with propylene, for example comonomers such as ethylene and/or $C_4$ to $C_{12}$ α-olefins, in particular ethylene and/or $C_4$ to $C_8$ α-olefins, e.g. 1-butene and/or 1-hexene. Preferably the propylene copolymer (R-PP) according to this invention comprises, especially consists of, monomers copolymerizable with propylene from the group consisting of ethylene, 1-butene and 1-hexene. More specifically the propylene copolymer (R-PP) of this invention comprises—apart from propylene—units derivable from ethylene and/or 1-butene.

In a preferred embodiment the propylene copolymer (R-PP) according to this invention comprises units derivable from ethylene and propylene only.

Additionally, it is appreciated that the propylene copolymer (R-PP) preferably has a comonomer content in a very specific range which contributes to the impact strength and the good optical properties. Thus, it is required that the comonomer content of the propylene copolymer (R-PP) is in the range of 1.5 to 8.0 wt.-%, preferably in the range of 1.5 to 6.0 wt.-%, more preferably in the range of 2.0 to 4.5 wt.-%, still more preferably in the range of 2.0 to 3.5 wt.-% and most preferably in the range of 2.5 to 3.5 wt.-%, based on the total weight of the propylene copolymer (R-PP).

Preferably, the propylene copolymer (R-PP) has a melting temperature in the range of 135 to 165° C., preferably in the range of 140 to 160° C., like in the range of 150 to 160° C.

Further it is preferred that the propylene copolymer (R-PP) has a crystallization temperature of at least 110° C., more preferably in the range of 110 to 125° C., still more preferably in the range of 112 to 124° C., like in the range of 117 to 124° C.

Preferably, the propylene copolymer (R-PP) has a xylene cold soluble fraction (XCS) in the range of 2.0 to 25.0 wt.-%, preferably in the range of 2.5 to 20.0 wt.-%, more preferably in the range of 2.5 to 8.0 wt-%.

Preferably the propylene copolymer (R-PP) according to this invention has been produced in the presence of a Ziegler-Natta catalyst. The catalyst influences in particular the microstructure of the polymer. In particular, polypropylenes prepared by using a metallocene catalyst provide a different microstructure compared to polypropylenes prepared by using Ziegler-Natta (ZN) catalysts. The most significant difference is the presence of regio-defects in metallocene-made polypropylenes which is not the case for polypropylenes made by Ziegler-Natta (ZN). The regio-defects can be of three different types, namely 2,1-erythro (2,1e), 2,1-threo (2,1t) and 3,1 defects. A detailed description of the structure and mechanism of formation of regio-defects in polypropylene can be found in Chemical Reviews 2000,100(4), pages 1316-1327.

The term "2,1 regio defects" as used in the present invention defines the sum of 2,1 erythro regio-defects and 2,1 threo regio-defects.

Accordingly, it is preferred that the propylene copolymer (R-PP) according to this invention has 2,1 regio-defects, like 2,1 erythro regio-defects, of at most 0.4%, more preferably of at most 0.3%, still more preferably of at most 0.2%, determined by $^{13}$C-NMR spectroscopy. In one specific embodiment no 2,1 regio-defects, like 2,1 erythro regio-defects, are detectable for the propylene copolymer (R-PP).

The propylene copolymer (R-PP) preferably comprises at least two polymer fractions, like two or three polymer fraction, all of them being propylene copolymers. Preferably, the propylene copolymer (R-PP) comprises at least two different propylene copolymer fractions, like two different propylene copolymer fractions, wherein further the two propylene copolymer fractions preferably differ in the comonomer content.

In one embodiment, the propylene copolymer (R-PP) consists of a first propylene copolymer fraction (R-PP1) and a second propylene copolymer fraction (R-PP2).

Accordingly, the propylene copolymer (R-PP) is preferably multimodal, like bimodal, in view of the molecular weight distribution and/or the comonomer content distribution.

As will be explained below, the polymer components of the propylene copolymers (R-PP) can be produced in a sequential step process, using reactors in serial configuration and operating at different reaction conditions. As a consequence, each fraction prepared in a specific reactor will have its own molecular weight distribution and/or comonomer content distribution.

When the distribution curves (molecular weight or comonomer content) from these fractions are superimposed to obtain the molecular weight distribution curve or the comonomer content distribution curve of the final polymer, these curves may show two or more maxima or at least be distinctly broadened when compared with curves for the individual fractions. Such a polymer, produced in two or more serial steps, is called bimodal or multimodal, depending on the number of steps.

Accordingly, the propylene copolymer (R-PP) can be multimodal, like bimodal, in view of the comonomer content and/or molecular weight. It is in particular appreciated that the propylene copolymer (R-PP) is multimodal, like bimodal, in view of the comonomer content.

Further, in case the propylene copolymer (R-PP) is of multimodal, like bimodal, character, in particular multimodal, like bimodal, in view of the comonomer content, it is appreciated that the individual fractions are present in amounts influencing the properties of the material. Accordingly it is appreciated that each of these fractions is at least present in the amount of 10.0 wt.-% based on the total weight of the propylene copolymer (R-PP). Accordingly, in case of a bimodal system, in particular in view of the comonomer content, the split of the two fractions is preferably 70/30 to 30/70, more preferably 65/35 to 35/65, like 50/50 to 40/60.

Accordingly, the weight ratio between the first propylene copolymer fraction (R-PP1) and the second propylene copolymer fraction (R-PP2) is preferably 70/30 to 30/70, more preferably 65/35 to 35/65. For example, the weight ratio between the first propylene copolymer fraction (R-PP1) and the second propylene copolymer fraction (R-PP2) is 50/50 to 40/60.

As already indicated above, the comonomers of the first propylene copolymer fraction (R-PP1) and the second propylene copolymer fraction (R-PP2), respectively, which are copolymerizable with propylene are ethylene and/or $C_4$ to $C_{12}$ α-olefins, in particular ethylene and/or $C_4$ to $C_8$ α-olefins, e.g. 1-butene and/or 1-hexene. Preferably, the first propylene copolymer fraction (R-PP1) and second propylene copolymer fraction (R-PP2), respectively, comprise, especially consist of, monomers copolymerizable with propylene from the group consisting of ethylene, 1-butene and 1-hexene. More specifically, the first propylene copolymer fraction (R-PP1) and second propylene copolymer fraction (R-PP2), respectively, comprise—apart from propylene—units derivable from ethylene and/or 1 butene. In a preferred embodiment, the first propylene copolymer fraction (R-PP1) and the second propylene copolymer fraction (R-PP2) comprise the same comonomers, i.e. ethylene only.

It is appreciated that the comonomer content of the first propylene copolymer fraction (R-PP1) and the second propylene copolymer fraction (R-PP2) fulfill a specific in-equation.

Accordingly, it is preferred that the first propylene copolymer fraction (R-PP1) and the second propylene copolymer fraction (R-PP2) fulfill together the in-equation (I), more preferably in-equation (Ia), still more preferably in-equation (Ib), $$\frac{Co(R-PP2)}{Co(R-PP1)} \geq 1.0, \tag{I}$$

$$1 \leq \frac{Co(R-PP2)}{Co(R-PP1)} \leq 4.0, \tag{Ia}$$

$$1 \leq \frac{Co(R-PP2)}{Co(R-PP1)} \leq 3.0 \tag{Ib}$$

wherein
Co (R-PP1) is the comonomer content [wt.-%] of the first propylene copolymer fraction (R-PP1),
Co (R-PP2) is the comonomer content [wt.-%] of the second propylene copolymer fraction (R-PP2).

Additionally or alternatively, it is preferred that the propylene copolymer (R-PP) has higher comonomer content than the first propylene copolymer fraction (R-PP1). Accordingly, the first propylene copolymer fraction (R-PP1) and the propylene copolymer (R-PP) preferably fulfill together the in-equation (II), more preferably in-equation (IIa), still more preferably in-equation (IIb), $$\frac{Co(R-PP)}{Co(R-PP1)} \geq 1.0, \tag{II}$$

$$1 \leq \frac{Co(R-PP)}{Co(R-PP1)} \leq 3.0, \tag{IIa}$$

$$1 \leq \frac{Co(R-PP)}{Co(R-PP1)} \leq 2.5 \tag{IIb}$$

wherein
Co (R-PP1) is the comonomer content [wt.-%] of the first propylene copolymer fraction (R-PP1),
Co (R-PP) is the comonomer content [wt.-%] of the propylene copolymer (R-PP).

Accordingly, it is preferred that the first propylene copolymer fraction (R-PP1) of the propylene copolymer (R-PP) has a lower comonomer content than the propylene copolymer (R-PP).

It is preferred that the first propylene copolymer fraction (R-PP1) of the propylene copolymer (R-PP) has a comonomer content in the range of 0.8 to 2.5 wt.-%, preferably in the range of 1.0 to 2.3 wt.-%, more preferably in the range of 1.2 to 2.0 wt.-%, based on the total weight of the first propylene copolymer fraction (R-PP1).

Additionally or alternatively, the second propylene copolymer fraction (R-PP2) of the propylene copolymer (R-PP) has a comonomer content in the range of more than 2.5 to 10.0 wt.-%, preferably in the range of more than 2.5 to 7.0 wt.-%, more preferably in the range of more than 2.5 to 5.0 wt.-%, based on the total weight of the second propylene copolymer fraction (R-PP2).

In one embodiment, the two polymer copolymer fractions of the propylene copolymer (R-PP) the melt flow rate $MFR_2$ (230° C.) of the first propylene copolymer fraction (R-PP1) and the second propylene copolymer fraction (R-PP2) fulfill together in-equation (III), more preferably in equation (IIIa), still more preferably in equation (IIIb), $$0.5 \leq \frac{MFR(R-PP1)}{MFR(R-PP2)} \geq 1.5 \tag{III}$$

-continued $$0.8 \le \frac{MFR(R-PP1)}{MFR(R-PP2)} \le 1.2 \quad \text{(IIIa)}$$

$$0.9 \le \frac{MFR(R-PP1)}{MFR(R-PP2)} \le 1.1 \quad \text{(IIIb)}$$

wherein

MFR (R-PP1) is the melt flow rate MFR$_2$ (230° C.) [g/10 min] of the first propylene copolymer fraction (R-PP1), MFR (R-PP2) is the melt flow rate MFR$_2$ (230° C.) [g/10 min] of the second propylene copolymer fraction (R-PP2).

Additionally or alternatively, the melt flow rate MFR$_2$ (230° C.) of the first propylene copolymer fraction (R-PP1) and the melt flow rate MFR$_2$ (230° C.) of the second propylene copolymer fraction (R-PP2) differ by no more than 5.0 g/10 min, more preferably by no more than 3.0 g/10 min and most preferably by no more than 2.0 g/10 min. In one embodiment, the melt flow rate MFR$_2$ (230° C.) of the first propylene copolymer fraction (R-PP1) and the melt flow rate MFR$_2$ (230° C.) of the second propylene copolymer fraction (R-PP2) are the same.

It is thus appreciated that the melt flow rate MFR$_2$ (230° C.) of the first propylene copolymer fraction (R-PP1) and the melt flow rate MFR$_2$ (230° C.) of the propylene copolymer (R-PP) differ by no more than 5.0 g/10 min, more preferably by no more than 3.0 g/10 min and most preferably by no more than 2.0 g/10 min. In one embodiment, the melt flow rate MFR$_2$ (230° C.) of the first propylene copolymer fraction (R-PP1) and the melt flow rate MFR$_2$ (230° C.) of the propylene copolymer (R-PP) are the same.

It is thus preferred that the propylene copolymer (R-PP) comprises, preferably consists of, a first propylene copolymer fraction (R-PP1) and a second propylene copolymer fraction (R-PP2), wherein further the first propylene copolymer fraction (R-PP1) and the second propylene copolymer fraction (R-PP2) differ in the comonomer content and the melt flow rate MFR$_2$ (230° C.) is the same.

The propylene copolymer (R-PP) as defined in the instant invention may contain up to 5.0 wt.-% additives, like α-nucleating agents and antioxidants, as well as slip agents and antiblocking agents. Preferably the additive content (without α-nucleating agents) is below 3.0 wt.-%, like below 1.0 wt.-%, based on the total weight of the propylene copolymer (R-PP).

Preferably the propylene copolymer (R-PP) comprises a α-nucleating agent. Even more preferred the present invention is free of β-nucleating agents. The α-nucleating agent is preferably selected from the group consisting of (i) salts of monocarboxylic acids and polycarboxylic acids, e.g. sodium benzoate or aluminum tert-butylbenzoate, and (ii) dibenzylidenesorbitol (e.g. 1,3:2,4 dibenzylidenesorbitol) and C$_1$-C$_8$-alkyl-substituted dibenzylidenesorbitol derivatives, such as methyldibenzylidenesorbitol, ethyldibenzylidenesorbitol or dimethyldibenzylidenesorbitol (e.g. 1,3:2,4 di(methylbenzylidene) sorbitol), or substituted nonitol-derivatives, such as 1,2,3,-trideoxy-4,6:5,7-bis-O-[(4-propylphenyl)methylene]-nonitol, and (iii) salts of diesters of phosphoric acid, e.g. sodium 2,2'-methylenebis (4,6,-di-tert-butylphenyl) phosphate or aluminium-hydroxy-bis[2,2'-methylene-bis(4,6-di-t-butylphenyl)phosphate], and (iv) vinylcycloalkane polymer and vinylalkane polymer (as discussed in more detail below), and (v) mixtures thereof.

Such additives are generally commercially available and are described, for example, in "Plastic Additives Handbook", 5th edition, 2001 of Hans Zweifel.

Preferably the propylene copolymer (R-PP) contains up to 2.0 wt.-% of the α-nucleating agent. In a preferred embodiment, the propylene copolymer (R-PP) contains not more than 2000 ppm, more preferably of 1 to 2000 ppm, more preferably of 5 to 1500 ppm of a α-nucleating agent, in particular selected from the group consisting of dibenzylidenesorbitol (e.g. 1,3:2,4 dibenzylidene sorbitol), dibenzylidenesorbitol derivative, preferably dimethyldibenzylidenesorbitol (e.g. 1,3:2,4 di(methylbenzylidene) sorbitol), or substituted nonitol-derivatives, such as 1,2,3,-trideoxy-4,6:5,7-bis-O-[(4-propylphenyl)methylene]-nonitol, vinylcycloalkane polymer, vinylalkane polymer, and mixtures thereof. Preferably, it is desired that the propylene copolymer (R-PP) shows good impact behavior. Accordingly, it is appreciated that the propylene copolymer (R-PP) has Charpy notched impact strength at +23° C. of at least 4.0 kJ/m$^2$, more preferably in the range of 4.0 to 15.0 kJ/m$^2$, still more preferably in the range of 5.0 to 12.0 kJ/m$^2$.

Further, also the tensile modulus of the propylene copolymer (R-PP) should be rather high. It is preferred that the tensile modulus of the propylene copolymer (R-PP) is at least 800 MPa, more preferably in the range of 900 to 1800 MPa, even more preferably of 1000 to 1600 MPa, still more preferably in the range of 1000 to 1500 MPa.

As already indicated above, the propylene copolymer (R-PP) according to this invention is preferably produced in a sequential polymerization process in the presence of a Ziegler-Natta catalyst as defined below.

Accordingly it is preferred that the propylene copolymer (R-PP) is produced in the presence of (a) a Ziegler-Natta catalyst (ZN-C) comprising a titanium compound (TC) having at least one titanium-halogen bond, and an internal donor (ID), both supported on a magnesium halide, (b) a co-catalyst (Co), and (c) an external donor (ED), wherein (i) the internal donor (ID) comprises at least 80 wt.-% of a succinate; and (ii) the molar-ratio of co-catalyst (Co) to external donor (ED) [Co/ED] is 10 to 45.

Preferably the propylene copolymer (R-PP) is produced in a sequential polymerization process comprising at least two polymerization reactors (R1) and (R2), in the first polymerization reactor (R1) the first propylene copolymer fraction (R-PP1) is produced and subsequently transferred into the second polymerization reactor (R2), in the second polymerization reactor (R2) the second propylene copolymer fraction (R-PP2) is produced in the presence of the first propylene copolymer fraction (R-PP1).

The term "sequential polymerization system" indicates that the propylene copolymer (R-PP) is produced in at least two polymerization reactors connected in series. Accordingly the present polymerization system comprises at least a first polymerization reactor (R1) and a second polymerization reactor (R2), and optionally a third polymerization reactor (R3). The term "polymerization reactor" shall indicate that the main polymerization takes place. Thus, in case the process consists of two polymerization reactors, this definition does not exclude the option that the overall system comprises for instance a pre-polymerization step in a pre-polymerization reactor. The term "consist of" is only a closing formulation in view of the main polymerization reactors.

Preferably, one, more preferably none, of the polymerization reactors (R1) and (R2) and optional third polymerization reactor (R3) is a gas phase reactor (GPR). A gas phase reactor (GPR) according to this invention is preferably a fluidized bed reactor, a fast fluidized bed reactor or a settled bed reactor or any combination thereof.

Accordingly, the polymerization reactors (R1) and (R2) and the optional third polymerization reactor (R3) are preferably slurry reactors (SR) and can be any continuous or simple stirred batch tank reactor or loop reactor operating in bulk or slurry. In one embodiment, the term "bulk" means a polymerization in a reaction medium that comprises of at least 60% (w/w) monomer. According to the present invention the slurry reactor (SR) is preferably a (bulk) loop reactor (LR). For example, the polymerization reactors (R1) and (R2) and the optional third polymerization reactor (R3) are preferably loop reactors (LR), i.e. first loop reactor (LR1), second loop reactor (LR2) and optionally third loop reactor (LR3). Accordingly, the average concentration of propylene copolymer (R-PP), i.e. the first fraction ($1^{st}$ F) of the propylene copolymer (R-PP) (i.e. the first propylene copolymer fraction (R-PP1)), in the polymer slurry within the first loop reactor (LR1) is typically from 15.0 wt.-% to 55.0 wt.-%, based on the total weight of the polymer slurry within the first loop reactor (LR1). In one preferred embodiment of the present invention, the average concentration of the first propylene copolymer fraction (R-PP1) in the polymer slurry within the first loop reactor (LR1) is from 20.0 wt.-% to 55.0 wt.-% and more preferably from 25.0 wt.-% to 52.0 wt.-%, based on the total weight of the polymer slurry within the first loop reactor (LR1).

Preferably, the propylene copolymer of the first polymerization reactor (R1), i.e. the first propylene copolymer fraction (R-PP1), more preferably the polymer slurry of the loop reactor (LR1) containing the first propylene copolymer fraction (R-PP1), is directly fed into the second polymerization reactor (R2), i.e. into the second loop reactor (LR2), without a flash step between the stages. This kind of direct feed is described in EP 887379 A, EP 887380 A, EP 887381 A and EP 991684 A. By "direct feed" is meant a process wherein the content of the first polymerization reactor (R1), i.e. of the loop reactor (LR1), the polymer slurry comprising the first propylene copolymer fraction (R-PP1), is led directly to the next stage polymerization reactor (R2), i.e. the loop reactor (LR2).

Alternatively, the propylene copolymer of the first polymerization reactor (R1), i.e. the first propylene copolymer fraction (R-PP1), more preferably polymer slurry of the loop reactor (LR1) containing the first propylene copolymer fraction (R-PP1), may be also directed into a flash step or through a further concentration step before fed into the second polymerization reactor (R2), i.e. into the loop reactor (LR2). Accordingly, this "indirect feed" refers to a process wherein the content of the first polymerization reactor (R1), of the loop reactor (LR1), i.e. the polymer slurry, is fed into the second polymerization reactor (R2), into the second loop reactor (LR2), via a reaction medium separation unit and the reaction medium as a gas from the separation unit.

In case one of the polymerization reactors (R1) and (R2) and optional third polymerization reactor (R3) is a gas phase reactor (GPR), preferably the second polymerization reactor (R2), and any subsequent reactor, for instance the third polymerization reactor (R3), are preferably gas phase reactors (GPRs). Such gas phase reactors (GPR) can be any mechanically mixed or fluid bed reactors. Preferably, the gas phase reactors (GPRs) comprise a mechanically agitated fluid bed reactor with gas velocities of at least 0.2 m/sec. Thus, it is appreciated that the gas phase reactor is a fluidized bed type reactor preferably with a mechanical stirrer.

In one preferred embodiment, the first polymerization reactor (R1) as well as the second polymerization reactor (R2) and any optional subsequent reactor, like the third polymerization reactor (R3) are slurry reactors (SR), like loop reactors (LR). If needed prior to the first slurry reactor (SR1) a pre-polymerization reactor is placed.

The Ziegler-Natta catalyst (ZN-C) is fed into the first polymerization reactor (R1) and is transferred with the polymer (slurry) obtained in the first polymerization reactor (R1) into the subsequent reactors. If the process covers also a pre-polymerization step it is preferred that the Ziegler-Natta catalyst (ZN-C) is fed in the pre-polymerization reactor. Subsequently the pre-polymerization product containing the Ziegler-Natta catalyst (ZN-C) is transferred into the first polymerization reactor (R1).

Especially good results are achieved in case the temperature in the reactors is carefully chosen.

Accordingly it is preferred that the operating temperature in the first polymerization reactor (R1) is in the range of 70 to 85° C., more preferably in the range of 75 to 85° C., still more preferably in the range of 77 to 83° C., like in the range of 78 to 82° C., i.e. 80° C.

Alternatively or additionally to the previous paragraph it is preferred that the operating temperature in the second polymerization reactor (R2) and optional in the third polymerization reactor (R3) is in the range of 75 to 95° C., more preferably in the range of 78 to 92° C.

Preferably the operating temperature in the second polymerization reactor (R2) is equal or higher to the operating temperature in the first polymerization reactor (R1). Accordingly it is preferred that the operating temperature (a) in the first polymerization reactor (R1) is in the range of 70 to 85° C., more preferably in the range of 75 to 85° C., still more preferably in the range of 77 to 83° C., like in the range of 78 to 82° C., i.e. 80° C., and (b) in the second polymerization reactor (R2) is in the range of 75 to 95° C., more preferably in the range of 78 to 92° C., still more preferably in the range of 78 to 88° C., with the proviso that the operating temperature in the second polymerization reactor (R2) is equal or higher to the operating temperature in the first polymerization reactor (R1).

Still more preferably the operating temperature of the third polymerization reactor (R3)—if present—is higher than the operating temperature in the first polymerization reactor (R1). In one specific embodiment the operating temperature of the third polymerization reactor (R3)—if present—is higher than the operating temperature in the first polymerization reactor (R1) and in the second polymerization reactor (R2). Accordingly, it is preferred that the operating temperature (a) in the first polymerization reactor (R1) is in the range of 70 to 85° C., more preferably in the range of 75 to 85° C., still more preferably in the range of 77 to 83° C., like in the range of 78 to 82° C., i.e. 80° C., (b) in the second polymerization reactor (R2) is in the range of 75 to 95° C., more preferably in the range of 78 to 92° C., still more preferably in the range of 78 to 88° C., and (c) in the third polymerization reactor (R3)—if present—is in the range of 75 to 95° C., more preferably in the range of 80 to 95° C., still more preferably in the range of 85 to 92° C., like in the range of 87 to 92° C., with the proviso that the operating temperature in the second polymerization reactor (R2) is equal or higher to the operating temperature in the first polymerization reactor (R1) and with the proviso that the third polymerization reactor (R3) is higher than the operating temperature in the first polymerization reactor (R1), preferably is higher than the operating temperature in the first polymerization reactor (R1) and in the second polymerization reactor (R2).

Typically the pressure in the first polymerization reactor (R1) as well as the second polymerization reactor (R2) and optionally in any subsequent polymerization reactor, preferably in the loop reactors (LR), is in the range of from 20 to 80 bar, preferably 30 to 70 bar, like 35 to 65 bar.

Preferably hydrogen is added in each polymerization reactor in order to control the molecular weight, i.e. the melt flow rate $MFR_2$.

Preferably the average residence time is rather long in the polymerization reactors (R1) and (R2). In general, the average residence time ($\tau$) is defined as the ratio of the reaction volume ($V_R$) to the volumetric outflow rate from the reactor ($Q_o$) (i.e. $V_R/Q_o$), i.e $\tau=V_R/Q_o$ [tau=$V_R/Q_o$]. In case of a loop reactor the reaction volume ($V_R$) equals to the reactor volume.

Accordingly the average residence time ($\tau$) in the first polymerization reactor (R1) is preferably at least 20 min, more preferably in the range of 20 to 45 min, still more preferably in the range of 25 to 42 min, like in the range of 28 to 40 min, and/or the average residence time ($\tau$) in the second polymerization reactor (R2) is preferably at least 90 min, more preferably in the range of 90 to 220 min, still more preferably in the range of 100 to 210 min, yet more preferably in the range of 105 to 200 min, like in the range of 105 to 190 min. Preferably the average residence time ($\tau$) in the third polymerization reactor (R3)—if present—is preferably at least 30 min, more preferably in the range of 30 to 90 min, still more preferably in the range of 40 to 80 min, like in the range of 50 to 80 min.

Further it is preferred that the average residence time ($\tau$) in the total sequential polymerization system, more preferably that the average residence time ($\tau$) in the first (R1) second polymerization reactors (R2) and optional third polymerization reactor (R3) together, is at least 160 min, more preferably at least 180 min, still more preferably in the range of 160 to 260 min, more preferably in the range of 180 to 240 min, still more preferably in the range of 190 to 230 min, yet more preferably in the range of 200 to 225 min.

As mentioned above the instant process can comprises in addition to the (main) polymerization of the propylene copolymer (R-PP) in the at least two polymerization reactors (R1, R3 and optional R3) prior thereto a pre-polymerization in a pre-polymerization reactor (PR) upstream to the first polymerization reactor (R1).

In the pre-polymerization reactor (PR) a polypropylene (Pre-PP) is produced. The pre-polymerization is conducted in the presence of the Ziegler-Natta catalyst (ZN-C). According to this embodiment the Ziegler-Natta catalyst (ZN-C), the co-catalyst (Co), and the external donor (ED) are all introduced to the pre-polymerization step. However, this shall not exclude the option that at a later stage for instance further co-catalyst (Co) is added in the polymerization process, for instance in the first polymerization reactor (R1). In one embodiment the Ziegler-Natta catalyst (ZN-C), the co-catalyst (Co), and the external donor (ED) are only added in the pre-polymerization reactor (PR), if a pre-polymerization is applied.

The pre-polymerization reaction is typically conducted at a temperature of 0 to 60° C., preferably from 15 to 50° C., and more preferably from 20 to 45° C.

The pressure in the pre-polymerization reactor is not critical but must be sufficiently high to maintain the reaction mixture in liquid phase. Thus, the pressure may be from 20 to 100 bar, for example 30 to 70 bar.

In a preferred embodiment, the pre-polymerization is conducted as bulk slurry polymerization in liquid propylene, i.e. the liquid phase mainly comprises propylene, with optionally inert components dissolved therein. Furthermore, according to the present invention, an ethylene feed is employed during pre-polymerization as mentioned above.

It is possible to add other components also to the pre-polymerization stage. Thus, hydrogen may be added into the pre-polymerization stage to control the molecular weight of the polypropylene (Pre-PP) as is known in the art. Further, antistatic additive may be used to prevent the particles from adhering to each other or to the walls of the reactor.

The precise control of the pre-polymerization conditions and reaction parameters is within the skill of the art.

Due to the above defined process conditions in the pre-polymerization, preferably a mixture (MI) of the Ziegler-Natta catalyst (ZN-C) and the polypropylene (Pre-PP) produced in the pre-polymerization reactor (PR) is obtained. Preferably the Ziegler-Natta catalyst (ZN-C) is (finely) dispersed in the polypropylene (Pre-PP). In other words, the Ziegler-Natta catalyst (ZN-C) particles introduced in the pre-polymerization reactor (PR) split into smaller fragments which are evenly distributed within the growing polypropylene (Pre-PP). The sizes of the introduced Ziegler-Natta catalyst (ZN-C) particles as well as of the obtained fragments are not of essential relevance for the instant invention and within the skilled knowledge.

As mentioned above, if a pre-polymerization is used, subsequent to said pre-polymerization, the mixture (MI) of the Ziegler-Natta catalyst (ZN-C) and the polypropylene (Pre-PP) produced in the pre-polymerization reactor (PR) is transferred to the first polymerization reactor (R1). Typically the total amount of the polypropylene (Pre-PP) in the final propylene copolymer (R-PP) is rather low and typically not more than 5.0 wt.-%, more preferably not more than 4.0 wt.-%, still more preferably in the range of 0.5 to 4.0 wt.-%, like in the range 1.0 of to 3.0 wt.-%.

In case that pre-polymerization is not used, propylene and the other ingredients such as the Ziegler-Natta catalyst (ZN-C) are directly introduced into the first polymerization reactor (R1).

Accordingly the process according the instant invention comprises the following steps under the conditions set out above (a) in the first polymerization reactor (R1), i.e. in a loop reactor (LR1), propylene and a comonomer being ethylene and/or a $C_4$ to $C_{12}$ α-olefin, preferably propylene and ethylene, are polymerized obtaining a first propylene copolymer fraction (R-PP1) of the propylene copolymer (R-PP), (b) transferring said first propylene copolymer fraction (R-PP1) to a second polymerization reactor (R2), i.e. in a loop reactor (LR2), (c) in the second polymerization reactor (R2) propylene and a comonomer being ethylene and/or a $C_4$ to $C_{12}$ α-olefin, preferably propylene and ethylene, are polymerized in the presence of the first propylene copolymer fraction (R-PP1) obtaining a second propylene copolymer fraction (R-PP2) of the propylene copolymer (R-PP), said first propylene copolymer fraction (R-PP1) and said second propylene copolymer fraction (R-PP2) form the propylene copolymer (R-PP).

In the following the used catalyst is defined in more detail.

Preferably component (i) is a Ziegler-Natta procatalyst which contains a trans-esterification product of a lower alcohol and a phthalic ester.

The procatalyst used according to the invention is prepared by a) reacting a spray crystallized or emulsion solidified adduct of $MgCl_2$ and a $C_1$-$C_2$ alcohol with $TiCl_4$ b) reacting the product of stage a) with a dialkylphthalate of formula (I)

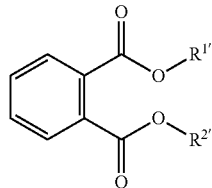
(I)

wherein $R^{1'}$ and $R^{2'}$ are independently at least a $C_5$ alkyl under conditions where a transesterification between said $C_1$ to $C_2$ alcohol and said dialkylphthalate of formula (I) takes place to form the internal donor c) washing the product of stage b) or d) optionally reacting the product of step c) with additional $TiCl_4$.

The procatalyst is produced as defined for example in the patent applications WO 87/07620, WO 92/19653, WO 92/19658 and EP 0 491 566. The content of these documents is herein included by reference.

First an adduct of $MgCl_2$ and a $C_1$-$C_2$ alcohol of the formula $MgCl_2*nROH$, wherein R is methyl or ethyl and n is 1 to 6, is formed. Ethanol is preferably used as alcohol.

The adduct, which is first melted and then spray crystallized or emulsion solidified, is used as catalyst carrier.

In the next step the spray crystallized or emulsion solidified adduct of the formula $MgCl_2*nROH$, wherein R is methyl or ethyl, preferably ethyl, and n is 1 to 6, is contacting with $TiCl_4$ to form a titanised carrier, followed by the steps of adding to said titanised carrier
  (i) a dialkylphthalate of formula (I) with $R^{1'}$ and $R^{2'}$ being independently at least a $C_5$-alkyl, like at least a $C_8$-alkyl,
or preferably
  (ii) a dialkylphthalate of formula (I) with $R^{1'}$ and $R^{2'}$ being the same and being at least a $C_5$-alkyl, like at least a $C_8$-alkyl,
or more preferably
  (iii) a dialkylphthalate of formula (I) selected from the group consisting of propylhexylphthalate (PrHP), dioctylphthalate (DOP), di-iso-decylphthalate (DIDP), and ditridecylphthalate (DTDP), yet more preferably the dialkylphthalate of formula (I) is a dioctylphthalate (DOP), like di-iso-octylphthalate or diethylhexylphthalate, in particular diethylhexylphthalate, to form a first product, subjecting said first product to suitable transesterification conditions, i.e. to a temperature above 100° C., preferably between 100 to 150° C., more preferably between 130 to 150° C., such that said methanol or ethanol is transesterified with said ester groups of said dialkylphthalate of formula (I) to form preferably at least 80 mol-%, more preferably 90 mol-%, most preferably 95 mol.-%, of a dialkylphthalate of formula (II)

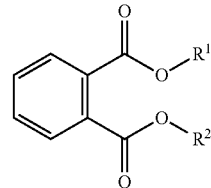
(II)

with $R^1$ and $R^2$ being methyl or ethyl, preferably ethyl, the dialkylphthalat of formula (II) being the internal donor and recovering said transesterification product as the procatalyst composition (component (i)).

The adduct of the formula $MgCl_2*nROH$, wherein R is methyl or ethyl and n is 1 to 6, is in a preferred embodiment melted and then the melt is preferably injected by a gas into a cooled solvent or a cooled gas, whereby the adduct is crystallized into a morphologically advantageous form, as for example described in WO 87/07620.

This crystallized adduct is preferably used as the catalyst carrier and reacted to the procatalyst useful in the present invention as described in WO 92/19658 and WO 92/19653.

As the catalyst residue is removed by extracting, an adduct of the titanised carrier and the internal donor is obtained, in which the group deriving from the ester alcohol has changed.

In case sufficient titanium remains on the carrier, it will act as an active element of the procatalyst.

Otherwise the titanization is repeated after the above treatment in order to ensure a sufficient titanium concentration and thus activity.

Preferably the procatalyst used according to the invention contains 2.5 wt.-% of titanium at the most, preferably 2.2% wt.-% at the most and more preferably 2.0 wt.-% at the most. Its donor content is preferably between 4 to 12 wt.-% and more preferably between 6 and 10 wt.-%.

More preferably the procatalyst used according to the invention has been produced by using ethanol as the alcohol and dioctylphthalate (DOP) as dialkylphthalate of formula (I), yielding diethyl phthalate (DEP) as the internal donor compound.

Still more preferably the catalyst used according to the invention is the catalyst as described in the example section; especially with the use of dioctylphthalate as dialkylphthalate of formula (I).

For the production of the propylene copolymer (R-PP), according to the invention the catalyst system used preferably comprises in addition to the special Ziegler-Natta procatalyst an organometallic cocatalyst as component (ii).

Accordingly, it is preferred to select the cocatalyst from the group consisting of trialkylaluminium, like triethylaluminium (TEA), dialkyl aluminium chloride and alkyl aluminium sesquichloride.

Component (iii) of the catalysts system used is an external donor represented by formula (IIIa) or (Iamb). Formula (IIIa) is defined by $$Si(OCH_3)_2R_2^5 \qquad (IIIa)$$

wherein $R^5$ represents a branched-alkyl group having 3 to 12 carbon atoms, preferably a branched-alkyl group having 3 to 6 carbon atoms, or a cyclo-alkyl having 4 to 12 carbon atoms, preferably a cyclo-alkyl having 5 to 8 carbon atoms.

It is in particular preferred that $R^5$ is selected from the group consisting of iso-propyl, iso-butyl, iso-pentyl, tert.- butyl, tert.-amyl, neopentyl, cyclopentyl, cyclohexyl, methylcyclopentyl and cycloheptyl.

Formula (Iamb) is defined by $$Si(OCH_2CH_3)_3(NR^xR^y) \quad \text{(Iamb)}$$

wherein $R^x$ and $R^y$ can be the same or different a represent a hydrocarbon group having 1 to 12 carbon atoms.

$R^x$ and $R^y$ are independently selected from the group consisting of linear aliphatic hydrocarbon group having 1 to 12 carbon atoms, branched aliphatic hydrocarbon group having 1 to 12 carbon atoms and cyclic aliphatic hydrocarbon group having 1 to 12 carbon atoms. It is in particular preferred that $R^x$ and $R^y$ are independently selected from the group consisting of methyl, ethyl, n-propyl, n-butyl, octyl, decanyl, iso-propyl, iso-butyl, iso-pentyl, tert.-butyl, tert.-amyl, neopentyl, cyclopentyl, cyclohexyl, methylcyclopentyl and cycloheptyl.

More preferably both $R^x$ and $R^y$ are the same, yet more preferably both $R^x$ and $R^y$ are an ethyl group.

More preferably the external donor of formula (Iamb) is diethylaminotriethoxysilane.

More preferably the external donor is selected from the group consisting of diethylaminotriethoxysilane [Si(OCH$_2$CH$_3$)$_3$(N(CH$_2$CH$_3$)$_2$)], dicyclopentyl dimethoxy silane [Si(OCH$_3$)$_2$(cyclo-pentyl)$_2$], diisopropyl dimethoxy silane [Si(OCH$_3$)$_2$(CH(CH$_3$)$_2$)$_2$] and mixtures thereof. Most preferably the external donor is dicyclopentyl dimethoxy silane [Si(OCH$_3$)$_2$(cyclo-pentyl)$_2$].

If desired the Ziegler-Natta procatalyst is modified by polymerizing a vinyl compound in the presence of the catalyst system, comprising the special Ziegler-Natta procatalyst (component (i)), the external donor (component (iii)) and optionally the cocatalyst (component (ii)), wherein the vinyl compound has the formula:

$$CH_2=CH-CHR^3R^4$$

wherein $R^3$ and $R^4$ together form a 5- or 6-membered saturated, unsaturated or aromatic ring or independently represent an alkyl group comprising 1 to 4 carbon atoms. The so modified catalyst is used for the preparation of the propylene copolymer, i.e. of the propylene copolymer (R-PP), according to this invention.

Mineral Filler (F)

A further essential component of the polymer composition according to the present invention is the mineral filler (F).

It is one specific requirement of the present invention that the polymer composition (C) comprises the mineral filler (F) in an amount from 20.0 to 40.0 wt.-% and preferably in the range of 25.0 to 35.0 wt.-%, based on the total weight of the composition.

It is one further requirement of the present invention that the mineral filler (F) is selected from the group consisting of talcum, wollastonite, caolin and mica.

In one embodiment of the present invention, the mineral filler (F) is talc.

The mineral filler (F) preferably has an average particle size d50 in the range of 0.5 to 20.0 µm, more preferably in the range of 0.75 to 15.0 µm, still more preferably in the range of 0.75 to 10.0 µm.

Typically, the mineral filler (F) has a cutoff particle size d95 [mass percent] of equal or below 30.0 µm, more preferably in the range from 1.5 to 30.0 µm, still more preferably in the range from 2.0 to 25.0 µm.

Additionally or alternatively, the mineral filler (F) has a BET surface area in the range from 1.0 to 50.0 m$^2$/g, more preferably in the range from 5.0 to 40.0 m$^2$/g, still more preferably in the range from 10.0 to 30.0 m$^2$/g.

It is preferred that the mineral filler (F) is present in a specific weight ratio compared to the propylene copolymer (R-PP) in the polypropylene composition (C).

For example, the weight ratio of propylene copolymer (R-PP) to the mineral filler (F) [HPP/F] is from 5.0:1.0 to 1.0:1.0. Preferably, the weight ratio of propylene copolymer (R-PP) to the mineral filler (F) [R-PP/F] is from 4.0:1.0 to 1.0:1.0, more preferably from 3.0:1.0 to 1.0:1.0 and most preferably from 3.0:1.0 to 2.0:1.0.

Elastomeric Copolymer (E)

The polymer composition according to the present invention optionally comprises an elastomeric copolymer (E).

Preferably, the polypropylene composition (C) comprises the elastomeric copolymer (E) in an amount from 2.0 to 15.0 wt.-%, based on the total weight of the composition. For example, the polypropylene composition (C) comprises the elastomeric copolymer (E) in an amount from 5.0 to 15.0 wt.-%, based on the total weight of the composition.

It is appreciated that the elastomeric copolymer (E) is preferably present in the polypropylene composition (C) in case the polypropylene composition (C) comprises the propylene copolymer (R-PP) in an amount of below 65.0 wt.-%, based on the total weight of the composition.

For example, the elastomeric copolymer (E) is present in the polypropylene composition (C) in case the polypropylene composition (C) comprises the propylene copolymer (R-PP) in an amount of below 64.0 wt.-%, based on the total weight of the composition. Preferably, the elastomeric copolymer (E) is present in the polypropylene composition (C) in case the polypropylene composition (C) comprises propylene copolymer (R-PP) in an amount ranging from 50.0 to 62.0 wt.-%, based on the total weight of the composition.

Accordingly, if the polypropylene composition (C) comprises an elastomeric copolymer (E), the polypropylene composition (C) preferably comprises
(a) 40.0 to 65.0 wt.-%, based on the total weight of the composition, of the propylene copolymer (R-PP) having
    (a1) a comonomer content in the range of 1.5 to 8.0 wt.-%, and
    (a2) a melt flow rate MFR$_2$ (230° C.) measured according to ISO 1133 in the range of 5.0 to 100.0 g/10 min,
(b) 2.0 to 15.0 wt.-%, based on the total weight of the composition, of the elastomeric copolymer (E), and
(c) 20.0 to 40.0 wt.-%, based on the total weight of the composition, of a mineral filler (F) being selected from the group consisting of talcum, wollastonite, caolin and mica,
wherein the polypropylene composition (C) has a melt flow rate MFR$_2$ (230° C.) measured according to ISO 1133 in the range of 5.0 to 45.0 g/10 min.

In one embodiment of the present invention, the polypropylene composition (C) comprises
(a) 45.0 to 64.0 wt.-%, based on the total weight of the composition, of the propylene copolymer (R-PP),
(b) 5.0 to 15.0 wt.-%, based on the total weight of the composition, of the elastomeric copolymer (E), and
(c) 21.0 to 40.0 wt.-%, based on the total weight of the composition, of the mineral filler (F).

For example, the polypropylene composition (C) comprises
(a) 50.0 to 62.0 wt.-%, based on the total weight of the composition, of the propylene copolymer (R-PP),
(b) 5.0 to 15.0 wt.-%, based on the total weight of the composition, of the elastomeric copolymer (E), and
(c) 23.0 to 40.0 wt.-%, based on the total weight of the composition, of the mineral filler (F).

The elastomeric copolymer (E) preferably has a melt flow rate $MFR_2$ (190° C.) measured according to ISO 1133 in the range of 0.25 to 30.0 g/10 min, preferably in the range of 0.25 to 20.0 g/10 min and most preferably in the range of 0.25 to 10.0 g/10 min.

The elastomeric copolymer (E) typically has a density of equal or less than 935 kg/m$^3$, preferably of equal or less than 900 kg/m$^3$, more preferably of equal or less than 890 kg/m$^3$, still more preferably in the range of 850 to 890 kg/m$^3$, like in the range of 850 to 880 kg/m$^3$.

It is preferred that the elastomeric copolymer (E) is an ethylene copolymer with comonomers selected from $C_4$ to $C_8$ α-olefins. For example, the elastomeric copolymer (E) comprises especially consists of, monomers copolymerizable with ethylene from the group consisting of propylene, 1-butene, 1-hexene and 1-octene.

More specifically, the elastomeric copolymer (E) of this invention comprises—apart from ethylene—units derivable from 1-hexene and 1-octene. In a preferred embodiment the elastomeric copolymer (E) comprises units derivable from ethylene and 1-octene only.

Additionally, it is appreciated that the elastomeric copolymer (E) has preferably a comonomer content in the range from 15.0 to 55.0 wt.-%, more preferably in the range from 20.0 to 50.0 wt.-%, yet more preferably in the range of more than 25.0 to 50.0 wt.-%, based on the total weight of the elastomeric copolymer (E).

It is appreciated that the polypropylene composition (C) comprises the elastomeric copolymer (E) in that it is dispersed in the propylene copolymer (R-PP).

It is preferred that the elastomeric copolymer (E) is present in a specific weight ratio compared to the propylene copolymer (R-PP) and/or the mineral filler (F) in the polypropylene composition (C).

For example, the weight ratio of propylene copolymer (R-PP) to the elastomeric copolymer (E) [RPP/E] is below 15.0. Preferably, the weight ratio of propylene copolymer (R-PP) to the elastomeric copolymer (E) [RPP/E] is from 15.0:1.0 to 1.0:1.0, more preferably from 12.0:1.0 to 2.0:1.0, and most preferably from 10.0:1.0 to 3.0:1.0.

Additionally or alternatively, the weight ratio of mineral filler (F) to the elastomeric copolymer (E) [F/E] is below 8.0. Preferably, the weight ratio of mineral filler (F) to the elastomeric copolymer (E) [F/E] is from 8.0:1.0 to 1.0:1.0, more preferably from 6.0:1.0 to 2.0:1.0.

Articles and Uses According to the Invention

It is appreciated that the instant polypropylene composition (C) is used to reduce paintability failure of a molded article, preferably to reduce paintability failure, i.e. to enhance paint adesion, of an injection molded article. It is especially preferred that the instant polypropylene composition (C) is used to reduce paintability failure, i.e. to enhance paint adhesion, of an injection molded article such as an automotive article, i.e. of an exterior or interior automotive article.

Preferably the polypropylene composition (C) is used to keep the average failed area, which is a measure of paint adhesion, of (injection) molded articles, preferably of automotive (injection) molded articles, such as exterior or interior automotive (injection) molded articles, equal or below 90 mm$^2$, more preferably in the range of 5 to equal or below 90 mm$^2$, still more preferably in the range of 10 to 70 mm$^2$, yet more preferably in the range of 5 to 65 mm$^2$. The measuring method for the average failed area is provided in the example section. Accordingly, it is to be noted that the molded articles prepared from the polypropylene composition (C) as defined herein shows a good stiffness/impact balance and high paint adhesion. Furthermore, the high paint adhesion is obtained without the use of primers.

In a preferred embodiment the polypropylene composition (C) as defined herein is part of the (injection) molded article, i.e. of the (interior or exterior) automotive article when used for reducing paintability failure. It is especially preferred that the polypropylene composition (C) is part of a composition, which is in turn part of the (injection) molded article, i.e. part of the (interior or exterior) automotive article.

In view of the very good results obtained, the present invention is not only directed to the polypropylene composition (C) as defined herein to reduce paintability failure, but also to an article in which the polypropylene composition (C) is part of it.

Accordingly the present invention is additionally directed to an article, like an automotive article, comprising the polypropylene composition (C), said composition comprises a propylene copolymer (R-PP) and a mineral filler (F), wherein the polypropylene composition preferably (C) comprises
  (a) 40.0 to 80.0 wt.-%, based on the total weight of the composition, of a propylene copolymer (R-PP) having
    (a1) a comonomer content in the range of 1.5 to 8.0 wt.-%, and
    (a2) a melt flow rate $MFR_2$ (230° C.) measured according to ISO 1133 in the range of 5.0 to 100.0 g/10 min, and
  (b) 20.0 to 40.0 wt.-%, based on the total weight of the composition, of a mineral filler (F) being selected from the group consisting of talcum, wollastonite, caolin and mica,
wherein the polypropylene composition (C) has a melt flow rate $MFR_2$ (230° C.) measured according to ISO 1133 in the range of 5.0 to 45.0 g/10 min.

The term "automotive article" used in the instant invention indicates that it is a formed three-dimensional article for the interior or exterior of automotives. Typical automotive articles are bumpers, side trims, step assists, body panels, rocker panels, spoilers, dash boards, interior trims and the like. The term "exterior" indicates that the article is not part of the car interior but part of the car's exterior. Accordingly, preferred exterior automotive articles are selected from the group consisting of bumpers, side trims, step assists, body panels, and spoilers. In contrast thereto, the term "interior" indicates that the article is part of the car interior but not part of the car's exterior. Accordingly, preferred interior automotive articles are selected from the group consisting of rocker panels, dash boards and interior trims.

Preferably the automotive article, i.e. the exterior automotive article, comprises equal or more than 80.0 wt.-%, more preferably equal or more than 90.0 wt.-%, yet more preferably equal or more than 95.0 wt.-%, still more preferably equal or more than 99.0 wt.-%, still yet more preferably consists, of the polypropylene composition (C).

Preferably, the present polypropylene composition (C) comprises as polymer components only the propylene copolymer (R-PP) and optionally the elastomeric copolymer (E). In other words the polypropylene composition (C) may contain further additives and the mineral filler (F) but no other polymer in an amount exceeding 4.0 wt-%, more preferably exceeding 3.0 wt.-%, like exceeding 2.0 wt.-%, based on the total weight of the polypropylene composition (C). One additional polymer which may be present in such low amounts is a polypropylene homopolymer (PP-H) as mentioned above. Thus, in one preferred embodiment, the (interior or exterior) automotive article and/or the polypropylene composition (C) contains as polymer component only the propylene copolymer (R-PP) and optionally the elastomeric copolymer (E) in amounts as mentioned above.

For mixing the individual components of the instant polypropylene composition (C), a conventional compounding or blending apparatus, e.g. a Banbury mixer, a 2-roll rubber mill, Buss-co-kneader or a twin screw extruder may be used. The polymer material recovered from the extruder are usually in the form of pellets. These pellets are then preferably further processed, e.g. by injection molding to generate the articles, i.e. the (interior or exterior) automotive articles.

The present invention will now be described in further detail by the examples provided below.

EXAMPLES

A. Measuring Methods

The following definitions of terms and determination methods apply for the above general description of the invention as well as to the below examples unless otherwise defined. The following definitions of terms and determination methods apply for the above general description of the invention as well as to the below examples unless otherwise defined. Calculation of comonomer content of the second propylene copolymer fraction (R-PP2):

$$\frac{C(PP) - w(PP1) \times C(PP1)}{w(PP2)} = C(PP2)$$

wherein w(PP1) is the weight fraction [in wt.-%] of the first propylene copolymer fraction (R-PP1), w(PP2) is the weight fraction [in wt.-%] of second propylene copolymer fraction (R-PP2), C(PP1) is the comonomer content [in wt.-%] of the first propylene copolymer fraction (R-PP1), C(PP) is the comonomer content [in wt.-%] of the propylene copolymer (R-PP), C(PP2) is the calculated comonomer content [in wt.-%] of the second propylene copolymer fraction (R-PP2).

Calculation of melt flow rate $MFR_2$ (230° C.) of the second propylene copolymer fraction (R-PP2):

$$MFR(PP2) = 10^{\left[\frac{\log(MFR(PP))-w(PP1)\times\log(MFR(PP1))}{w(PP2)}\right]}$$

wherein w(PP1) is the weight fraction [in wt.-%] of the first propylene copolymer fraction (R-PP1), w(PP2) is the weight fraction [in wt.-%] of second propylene copolymer fraction (R-PP2), MFR(PP1) is the melt flow rate $MFR_2$ (230° C.) [in g/10 min] of the first propylene copolymer fraction (R-PP1), MFR(PP) is the melt flow rate $MFR_2$ (230° C.) [in g/10 min] of the propylene copolymer (R-PP), MFR(PP2) is the calculated melt flow rate $MFR_2$ (230° C.) [in g/10 min] of the second propylene copolymer fraction (R-PP2).

Quantification of Copolymer Microstructure and Comonomer Content by NMR Spectroscopy Quantitative nuclear-magnetic resonance (NMR) spectroscopy was used to quantify the comonomer content of the polymers.

Quantitative $^{13}C$ $\{^1H\}$ NMR spectra were recorded in the solution-state using a Bruker Advance III 400 NMR spectrometer operating at 400.15 and 100.62 MHz for $^1H$ and $^{13}C$ respectively. All spectra were recorded using a $^{13}C$ optimised 10 mm extended temperature probehead at 125° C. using nitrogen gas for all pneumatics. Approximately 200 mg of material was dissolved in 3 ml of 1,2-tetrachloroethane-$d_2$ (TCE-$d_2$) along with chromium-(III)-acetylacetonate ($Cr(acac)_3$) resulting in a 65 mM solution of relaxation agent in solvent as described in G. Singh, A. Kothari, V. Gupta, Polymer Testing 2009, 28(5), 475.

To ensure a homogenous solution, after initial sample preparation in a heat block, the NMR tube was further heated in a rotatory oven for at least 1 hour. Upon insertion into the magnet the tube was spun at 10 Hz. This setup was chosen primarily for the high resolution and quantitatively needed for accurate ethylene content quantification. Standard single-pulse excitation was employed without NOE, using an optimised tip angle, 1 s recycle delay and a bi-level WALTZ16 decoupling scheme as described in Z. Zhou, R. Kuemmerle, X. Qiu, D. Redwine, R. Cong, A. Taha, D. Baugh, B. Winniford, J. Mag. Reson. 187 (2007) 225 and V. Busico, P. Carbonniere, R. Cipullo, C. Pellecchia, J. Severn, G. Talarico, Macromol. Rapid Commun. 2007, 28, 1128. A total of 6144 (6 k) transients were acquired per spectra. Quantitative $^{13}C$ $\{^1H\}$ NMR spectra were processed, integrated and relevant quantitative properties determined from the integrals. All chemical shifts were indirectly referenced to the central methylene group of the ethylene block (EEE) at 30.00 ppm using the chemical shift of the solvent. This approach allowed comparable referencing even when this structural unit was not present.

With characteristic signals corresponding to 2,1 erythro regio defects observed (as described in L. Resconi, L. Cavallo, A. Fait, F. Piemontesi, Chem. Rev. 2000, 100 (4), 1253, in Cheng, H. N., Macromolecules 1984, 17, 1950, and in W-J. Wang and S. Zhu, Macromolecules 2000, 33 1157) the correction for the influence of the regio defects on determined properties was required. Characteristic signals corresponding to other types of regio defects were not observed.

Characteristic signals corresponding to the incorporation of ethylene were observed (as described in Cheng, H. N., Macromolecules 1984, 17, 1950) and the comonomer fraction calculated as the fraction of ethylene in the polymer with respect to all monomer in the polymer.

The comonomer fraction was quantified using the method of W-J. Wang and S. Zhu, Macromolecules 2000, 33 1157, through integration of multiple signals across the whole spectral region in the $^{13}C$ $\{^1H\}$ spectra. This method was chosen for its robust nature and ability to account for the presence of regio-defects when needed. Integral regions were slightly adjusted to increase applicability across the whole range of encountered comonomer contents.

The mole percent comonomer incorporation was calculated from the mole fraction. The weight percent comonomer incorporation was calculated from the mole fraction.

Number Average Molecular Weight ($M_n$), Weight Average Molecular Weight ($M_w$) and Polydispersity (Mw/Mn)

are determined by Gel Permeation Chromatography (GPC) according to the following method:

The weight average molecular weight Mw and the polydispersity (Mw/Mn), wherein Mn is the number average molecular weight and Mw is the weight average molecular weight) is measured by a method based on ISO 16014-1: 2003 and ISO 16014-4:2003. A Waters Alliance GPCV 2000 instrument, equipped with refractive index detector and online viscosimeter was used with 3×TSK-gel columns (GMHXL-HT) from TosoHaas and 1,2,4-trichlorobenzene (TCB, stabilized with 200 mg/L 2,6-Di tert butyl-4-methylphenol) as solvent at 145° C. and at a constant flow rate of 1 mL/min. 216.5 µL of sample solution were injected per analysis. The column set was calibrated using relative calibration with 19 narrow MWD polystyrene (PS) standards in the range of 0.5 kg/mol to 11 500 kg/mol and a set of well characterized broad polypropylene standards. All samples were prepared by dissolving 5-10 mg of polymer in 10 mL (at 160° C.) of stabilized TCB (same as mobile phase) and keeping for 3 hours with continuous shaking prior sampling in into the GPC instrument.

The glass transition temperature Tg is determined by dynamic mechanical analysis according to ISO 6721-7. The measurements are done in torsion mode on compression moulded samples (40×10×1 mm$^3$) between −100° C. and +150° C. with a heating rate of 2° C./min and a frequency of 1 Hz.

Density is measured according to ISO 1183-187. Sample preparation is done by compression moulding in accordance with ISO 1872-2:2007.

MFR$_2$ (230° C.) is measured according to ISO 1133 (230° C., 2.16 kg load).

MFR$_2$ (190° C.) is measured according to ISO 1133 (190° C., 2.16 kg load).

Intrinsic viscosity is measured according to DIN ISO 1628/1, October 1999 (in Decalin at 135° C.).

Xylene Cold Soluble Fraction (XCS Wt %)

The xylene cold soluble fraction (XCS) is determined at 23° C. according to ISO 6427. Melting temperature $T_m$, crystallization temperature $T_c$, is measured with Mettler TA820 differential scanning calorimetry (DSC) on 5-10 mg samples. Both crystallization and melting curves were obtained during 10° C./min cooling and heating scans between 30° C. and 225° C. Melting and crystallization temperatures were taken as the peaks of endotherms and exotherms.

Also the melt- and crystallization enthalpy (Hm and Hc) were measured by the DSC method according to ISO 11357-1.

Median particle size d50 (Sedimentation) is calculated from the particle size distribution [mass percent] as determined by gravitational liquid sedimentation according to ISO 13317-3 (Sedigraph).

Tensile Modulus; Tensile stress at break; Tensile stress at yield; Tensile strain at yield; Tensile strength; Tensile strain at tensile strength; Tensile strain at break were measured according to ISO 527-2 (cross head speed=50 mm/min; 23° C.) using injection molded specimens as described in EN ISO 1873-2 (dog bone shape, 4 mm thickness).

Charpy impact test: The Charpy notched impact strength (Charpy NIS) is measured according to ISO 179-1/1eA/DIN 53453 at 23° C., −20° C. and −30° C., using injection molded bar test specimens of 80×10×4 mm$^3$ mm$^3$ prepared in accordance with ISO 294-1:1996.

Cutoff particle size d95 (Sedimentation) is calculated from the particle size distribution [mass percent] as determined by gravitational liquid sedimentation according to ISO 13317-3 (Sedigraph).

Surface area: BET with N$_2$ gas according to DIN 66131/2, apparatus Micromeritics Tristar 3000: sample preparation at a temperature of 50° C., 6 hours in vacuum.

Sample Preparation:

The maximum temperature of the melt was set to 240° C. The following conditions for the injection molding of test panels (80 mm×150 mm×2 mm) were used: melt temperature=240° C., mold temperature=50° C., and flow front velocity 100 mm/s.

The test panels were painted in a usual way with a standard laboratory painting process, which was composed of three consecutive steps (Power wash process, flame pre-treatment and painting process) and performed according *Borealis* QM work instructions (QMAA 3-430-04, available from *Borealis*). The panels were first purified in a simulated power wash process (pH 10, 30 bar, 30° C.). After being washed with desalinated water the panels were dried at room temperature.

For activating the panel surface, the burner Hill/Asis Brenner S220 available from Herbert Arnold GmbH, Germany was used. An air/methane ratio of 11:1 at a volume flowrate of 310:28.2 was adjusted for the flame pretreatment. The panels were pulled ahead on a skid with 800 mm/s and a distance from the flame of 8 cm.

A two layer paint systems consisting of a base coat and a clear coat was applied for painting consisting of a base coat paint and a clear coat.

As base coat paint HBL schwarz II (black waterborne base coat) of BASF SE was used (drying for 10 minutes at 70° C.). As clear coat LMKL Wörwag 108728 R3203H (solvent borne clear coat) of Karl Wörwag Lack- und Farbenfabrik GmbH & Co.KG was used (drying for 45 minutes at 80° C.).

After painting, the test panels were dried for 3 days at 50° C.

Afterwards the painted test panels were scratched with a Cutter 301 (according to DIN EN/ISO 17872:2007) such that a pre-fabricated scratch template was obtained.

Adhesion test: For the adhesion characterization, the resistance of the pre-fabricated scratch template to pressure-water jetting according to DIN 55662 (Method C) was tested.

A steam of hot water with temperature T was directed for time t at distance d under angle α to the surface of the test panel. Pressure of the water jet results from the water flow rate and is determined by the type of nozzle installed at the end of the water pipe.

The following parameters were used:

T (water)=60° C.; t=60 s; d=130 mm, α=90°, water flow rate 11.3 l/min, nozzle type=MPEG 2506.

The adhesion level was assessed by quantifying the failed average area per test point.

For each example 5 panels (size 80 mm×150 mm×2 mm) have been tested. The panels were produced by injection moulding with 240° C. melt temperature and 50° C. mould temperature.

The flow front velocity was 100 mm/s.

On each panel 5 certain points (see FIG. 1) were used to assess the paintability failure in [mm$^2$]. For this purpose an image of the test point before and after steam jet exposure was taken. Then the delaminated area was calculated with an image processing software. The average failed area for 5 test points on 5 test specimens (i.e. in total the average of 25 test points) was reported as average failed area.

2. Examples

The catalyst used in the polymerization process for R-PP as well as for the RTPO has been produced as follows: First, 0.1 mol of MgCl$_2$×3 EtOH was suspended under inert conditions in 250 ml of decane in a reactor at atmospheric pressure. The solution was cooled to the temperature of −15° C. and 300 ml of cold TiCl$_4$ was added while maintaining the temperature at said level. Then, the temperature of the slurry was increased slowly to 20° C. At this temperature, 0.02 mol of dioctylphthalate (DOP) was added to the slurry. After the addition of the phthalate, the temperature was raised to 135° C. during 90 minutes and the slurry was allowed to stand for 60 minutes. Then, another 300 ml of $TiCl_4$ was added and the temperature was kept at 135° C. for 120 minutes. After this, the catalyst was filtered from the liquid and washed six times with 300 ml heptane at 80° C. Then, the solid catalyst component was filtered and dried. Catalyst and its preparation concept is described in general e.g. in patent publications EP491566, EP591224 and EP586390. As co-catalyst triethyl-aluminium (TEAL) and as donor dicyclo pentyl dimethoxy silane (D-donor) was used. The aluminium to donor ratio is indicated in Table 1.

Before the polymerization, the catalyst was prepolymerized with vinyl cyclohexane in an amount to achieve a concentration of 200 ppm poly(vinyl cyclohexane) (PVCH) in the final polymer. The respective process is described in EP 1 028 984 and EP 1 183 307. As additives 0.04 wt. % synthetic hydrotalcite (DHT-4A supplied by Kisuma Chemicals, Netherlands) and 0.15 wt % Irganox B 215 (1:2-blend of Irganox 1010 (Pentaerythrityl-tetrakis(3-(3',5'-di-tert.butyl-4-hydroxytoluyl)-propionate and tris (2,4-di-t-butylphenyl) phosphate) phosphite) of BASF AG, Germany were added to the polymers in the same step. The analytics of the prepared samples can be also gathered from Tables 1 and 2.

The polymers were mixed with the mineral filler and extruded using a PRISM TSE 24 twin screw extruder with an L/D ratio of 30:1 and two sets of kneading blocks in the screw configuration using a melt temperature profile between 200 and 240° C.

TABLE 1a

Polymerization conditions of propylene copolymer R-PP

|  |  | R-PP |
| --- | --- | --- |
| Prepolymerisation |  |  |
| temperature | [° C.] | 30 |
| pressure | [bar] | 52.5 |
| Residence time | [h] | 0.29 |
| Al/Ti ratio | [mol/mol] | 240 |
| Al/donor ratio | [mol/mol] | 5 |
| Loop |  |  |
| Residence time | [h] | 0.40 |
| Temperature | [° C.] | 68 |
| $H_2$/C3 ratio | [mol/kmol] | 6.63 |
| C2/C3 ratio | [mol/kmol] | 2.9 |
| $MFR_2$ | [g/10 min] | 21.3 |
| $C_2$ total | [wt.-%] | 1.4 |
| XCS | [wt.-%] | 3.1 |
| Split | [wt.-%] | 59.3 |
| GPR 1 |  |  |
| Residence time | [h] | 2.02 |
| Temperature | [° C.] | 70 |
| $H_2$/C3 ratio | [mol/kmol] | 116 |
| C2/C3 ratio | [mol/kmol] | 25.3 |
| $MFR_2$ | [g/10 min] | 19.8 |
| $C_2$ total | [wt.-%] | 2.2 |
| XCS | [wt.-%] | 3.3 |
| Split | [wt.-%] | 40.7 |
| Flexural modulus | [MPa] | 1550 |
| Charpy notched, +23° C. | [kJ/m$^2$] | 5.1 |

TABLE 1b

Polymerization conditions of RTPO

| Parameter | unit | RTPO |
| --- | --- | --- |
| Prepolymerisation |  |  |
| temperature | [° C.] | 30 |
| pressure | [bar] | 56 |
| Al/donor ratio | [mol/mol] | 5.1 |
| residence time | [h] | 0.25 |
| Loop |  |  |
| temperature | [° C.] | 72 |
| pressure | [bar] | 56 |
| residence time | [h] | 0.22 |
| ethylene feed | [kg/h] | 0 |
| H2/C3 ratio | [mol/kmol] | 26.9 |
| C2 | [wt-%] | 0 |
| XCS | [wt.-%] | 3.4 |
| MFR | [g/10 min] | 294 |
| Split | [wt.-%] | 37.6 |
| GPR1 |  |  |
| temperature | [° C.] | 87 |
| pressure | [bar] | 22 |
| residence time | [h] | 0.34 |
| ethylene feed | [kg/h] | 0 |
| H2/C3 ratio | [mol/kmol] | 121.1 |
| C2 | [wt-%] | 0 |
| XCS | [wt.-%] | 3.1 |
| MFR | [g/10 min] | 230 |
| Split | [wt.-%] | 34.8 |
| GPR2 |  |  |
| temperature | [° C.] | 82 |
| pressure | [bar] | 22 |
| residence time | [h] | 0.13 |
| H2/C3 ratio | [mol/kmol] | 22.0 |
| C2/C3 ratio | [mol/kmol] | 305 |
| C2 | [wt %] | 9.7 |
| XCS | [wt.-%] | 21.6 |
| MFR | [g/10 min] | 67 |
| Split | [wt.-%] | 18.5 |
| GPR3 |  |  |
| temperature | [° C.] | 85 |
| pressure | [bar] | 22 |
| residence time | [h] | 0.58 |
| H2/C2 ratio | [mol/kmol] | 71.8 |
| C2/C3 ratio | [mol/kmol] | 305 |
| Split | [wt.-%] | 9.1 |

TABLE 2

Composition and properties of the prepared polypropylene compositions

|  |  | CE1 | CE2 | CE3 | IE1 | IE2 | IE3 | IE4 | IE5 |
|---|---|---|---|---|---|---|---|---|---|
| HECO1 | [wt.-%] | 62.5 | | | | | | | |
| HECO2 | [wt.-%] | | 62.5 | | | | | | |
| RTPO | [wt.-%] | | | 67 | | | | | |
| R-PP | [wt.-%] | | | | 66.5 | 60.5 | 54.5 | 60.5 | 54.5 |
| Talc | [wt.-%] | 30 | 30 | 30 | 30 | 30 | 30 | 30 | 30 |
| E1 | [wt.-%] | 4 | 4 | | | 6 | 12 | | |
| E2 | [wt.-%] | | | | | | | 6 | 12 |
| MFR$_2$ | g/10 min | 14.0 | 8.0 | 23.5 | 16.8 | 15.0 | 12.6 | 13.7 | 11.0 |
| Tensile Modulus | MPa | 4103 | 4055 | 3631 | 4023 | 3602 | 3147 | 3652 | 3095 |
| Impact strength, +23° C. | [kJ/m$^2$] | 4.4 | 4.6 | 3.7 | 1.9 | 2.6 | 4.5 | 2.6 | 4.8 |
| Impact strength, −20° C. | [kJ/m$^2$] | — | — | 1.9 | 1.2 | 1.2 | 1.4 | 1.2 | 1.4 |
| Average failed area | [mm$^2$] | 99 | 95 | 93 | 8 | 54 | 64 | 54 | 52 |

Remaining part to 100 wt.-% are additives, like antioxidants, nucleating agents, carbon black etc.

HECO1 is the commercial product BF970MO of *Borealis AG*, which is a heterophasic polypropylene having a melt flow rate MFR$_2$ (230° C.) of 20 g/10 min.

HECO2 is the commercial product BE677A1 of *Borealis AG*, which is a heterophasic polypropylene having a melt flow rate MFR$_2$ (230° C.) of 13.5 g/10 min.

Talc is the commercial product Luzenac HAR T84 of Luzenac having a BET of 16 m$^2$/g and an average particle size (d50) of 11.5 µm.

E1 is the commercial product Engage 8100 of *Borealis Plastomers*, which is an ethylene-1-octene copolymer having a density of 0.870 g/cm$^3$ and a melt flow rate MFR$_2$ (190° C.) of 1.1 g/10 min.

E2 is the commercial product Engage 8150 of Dow Elastomers, which is an ethylene-1-octene copolymer having a density of 0.868 g/cm$^3$ and a melt flow rate MFR$_2$ (190° C.) of 0.5 g/10 min.

FIG. 1 outlines the test lines used for evaluation of the failed painted areas.

The inventive materials IE1 to IE5 show a good balance of stiffness/impact. Furthermore, the test lines for the inventive materials IE1 to IE5 show much less failed areas compared to the comparative materials CE1 to CE3. Accordingly, the inventive materials IE1 to IE5 show a good stiffness/impact balance and high paint adhesion. Furthermore, the high paint adhesion is obtained without the use of primers.

The invention claimed is:

1. Polypropylene composition (C), the polypropylene composition (C) comprising:
   (a) 40.0 to 80.0 wt. %, based on the total weight of the composition, of a propylene copolymer (R-PP) wherein the propylene copolymer (R-PP) comprises two fractions, a first propylene copolymer fraction (R-PP1) and a second propylene copolymer fraction (R-PP2), said first propylene copolymer fraction (R-PP1) differs from said second propylene copolymer fraction (R-PP2) in the comonomer content; wherein the propylene copolymer (R-PP) having
      (a1) a comonomer content in the range of 1.5 to 8.0 wt. %, and
      (a2) a melt flow rate MFR$_2$ (230° C.) measured according to ISO 1133 in the range of 5.0 to 100.0 g/10 min, and
   wherein the propylene copolymer (R-PP) has:
      (a3) a glass transition temperature in the range of −12 to +2° C.; and/or
      (a4) no glass transition temperature below −20° C.; and
   (b) 20.0 to 40.0 wt. %, based on the total weight of the composition, of a mineral filler (F) being selected from the group consisting of talcum, wollastonite, kaolin, and mica,
   wherein the polypropylene composition (C) has a melt flow rate MFR$_2$ (230° C.) measured according to ISO 1133 in the range of 5.0 to 45.0 g/10 min.

2. The polypropylene composition (C) according to claim 1, wherein the propylene copolymer (R-PP) has:
   (a) a melting temperature in the range of 135 to 165° C., and/or
   (b) a tensile modulus of at least 800 MPa, and/or
   (c) a Charpy notched impact strength at +23° C. of ≥4 kJ/m$^2$.

3. The polypropylene composition (C) according to claim 1, wherein the propylene copolymer (R-PP):
   is monophasic.

4. The polypropylene composition (C) according to claim 1, wherein the propylene copolymer (R-PP) comprises a comonomer selected from ethylene, C$_4$ to C$_{12}$ α-olefin, and mixtures thereof.

5. The polypropylene composition (C) according to claim 1, wherein:
   (a) the weight ratio between the first propylene copolymer fraction (R-PP1) and the second propylene copolymer fraction (R-PP2) of the propylene copolymer (R-PP) [(R-PP1):(R-PP2)] is 70:30 to 30:70; and/or
   (b) the comonomers for the first propylene copolymer fraction (R-PP1) and the second propylene copolymer fraction (R-PP2) of the propylene copolymer (R-PP) are selected from ethylene, C$_4$ to C$_{12}$ α-olefin, and mixtures thereof.

6. The polypropylene composition (C) according to claim 1, wherein
   (a) the first propylene copolymer fraction (R-PP1) of the propylene copolymer (R-PP) is the comonomer lean fraction and the second propylene copolymer fraction (R-PP2) of the propylene copolymer (R-PP) is the comonomer rich fraction, and/or
   (b) the first propylene copolymer fraction (R-PP1) of the propylene copolymer (R-PP) has a lower comonomer content than the propylene copolymer (R-PP).

7. The polypropylene composition (C) according to claim 1, wherein:
   (a) the first propylene copolymer fraction (R-PP1) and the second propylene copolymer fraction (R-PP2) of the propylene copolymer (R-PP) fulfill together the in-equation (I)

$$\frac{Co(R-PP2)}{Co(R-PP1)} \geq 1.0; \quad (I)$$

wherein;
Co(R-PP1) is the comonomer content [wt. %] of the first propylene copolymer fraction (R-PP1),
Co(R-PP2) is the comonomer content [wt. %] of the second propylene copolymer fraction (R-PP2), and/or
(b) the first propylene copolymer fraction (R-PP1) and the propylene copolymer fraction (R-PP) fulfill together the in-equation (II):

$$\frac{Co(R-PP)}{Co(R-PP1)} \geq 1.0 \quad (II)$$

wherein;
Co(R-PP1) is the comonomer content [wt. %] of the first propylene copolymer fraction (R-PP1),
Co(R-PP) is the comonomer content [wt. %] of the propylene copolymer (R-PP).

8. The polypropylene composition (C) according to claim 1, wherein the mineral filler (F) is talcum.

9. The polypropylene composition (C) according to claim 1, wherein the polypropylene composition (C) comprises 2.0 to 15.0 wt. %, based on the total weight of the composition, of an elastomeric copolymer (E) comprising units derived from ethylene and $C_4$ to $C_8$ α-olefins.

10. The polypropylene composition (C) according to claim 9, wherein the elastomeric copolymer (E) has:
  (a) a density of equal or less than 935 kg/m³, and/or
  (b) a melt flow rate $MFR_2$ (190° C.) measured according to ISO 1133 in the range of 0.25 to 30.0 g/10 min.

11. Article comprising a polypropylene composition (C) according to claim 1.

12. The article according to claim 11, wherein the article is an automotive article selected from the group consisting of bumpers, body panels, rocker panels, side trims, step assists, spoilers and dash boards.

* * * * *